Figure 1:
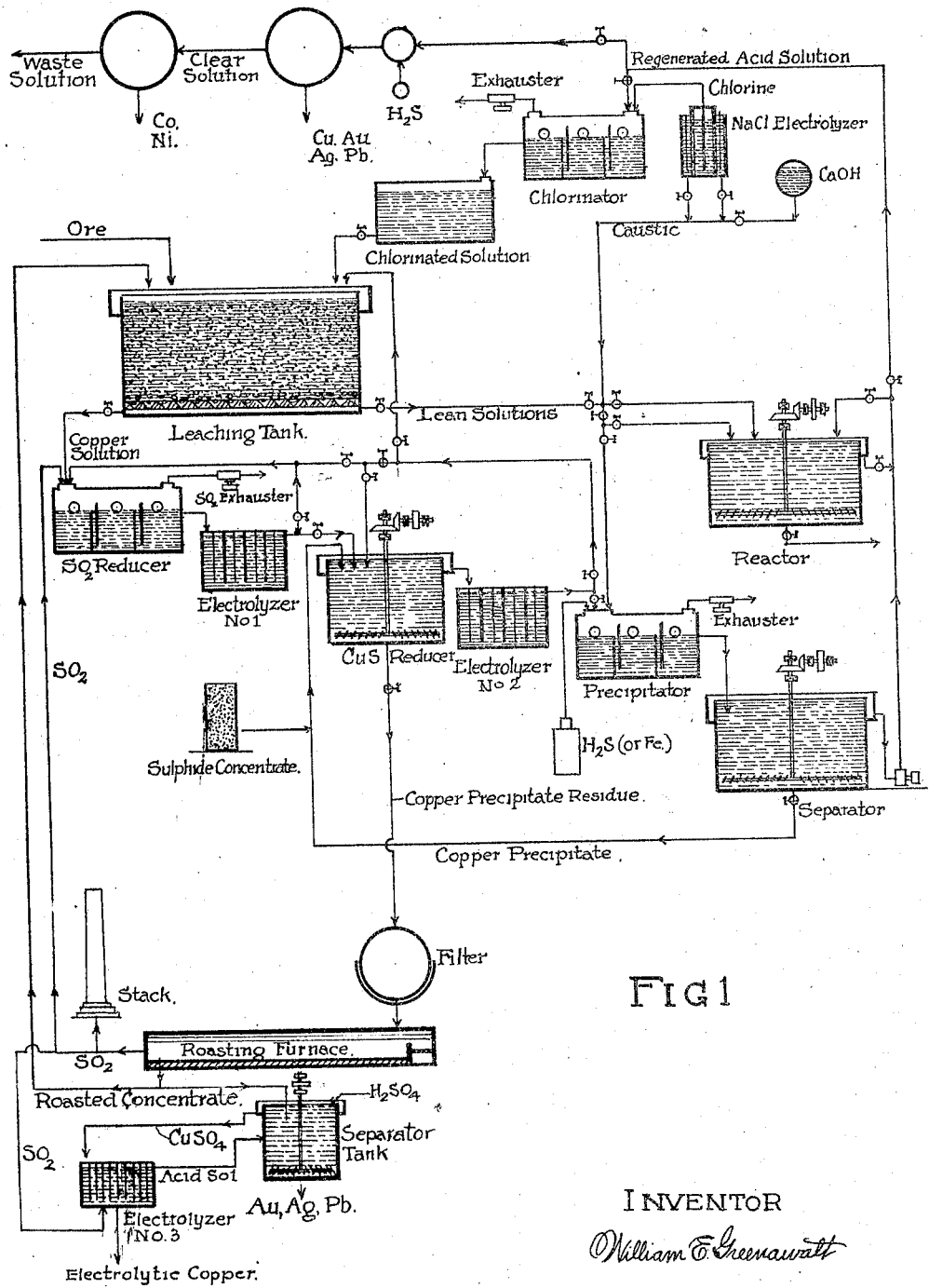

Mar. 3, 1925.

W. E. GREENAWALT 1,528,207

METALLURGICAL PROCESS

Filed April 2, 1923     2 Sheets—Sheet 1

INVENTOR
William E. Greenawalt

Patented Mar. 3, 1925.

1,528,207

UNITED STATES PATENT OFFICE.

WILLIAM E. GREENAWALT, OF DENVER, COLORADO.

METALLURGICAL PROCESS.

Application filed April 2, 1923. Serial No. 629,361.

*To all whom it may concern:*

Be it known that I, WILLIAM E. GREENAWALT, a citizen of the United States, residing in the city and county of Denver and State of Colorado, have invented certain new and useful Improvements in Metallurgical Processes, of which the following is a specification.

The invention is more specifically directed to the extraction of copper from its ores, especially from its ores containing precious and other metals.

In the treatment of copper ores by solvent processes, a considerable difficulty is presented in the extraction of gold and silver, as also copper as sulphide, in a mixed oxide and sulphide ore. Gold and silver are not soluble in sulphate solutions ordinarily used in leaching copper ores, nor is the copper in its sulphide combinations soluble in the ordinary acid solution, although it may be made soluble to a considerable extent in ferric sulphate solution. Neither are gold or silver, or copper in its sulphide combinations, appreciably soluble in chloride solutions, unless such solutions contain ferric salts or free chlorine.

This process may be considered as a continuation, or modification, of that shown in my pending application, Serial No. 380,361, filed May 10, 1920. In the process described in this application, the copper is precipitated from the solutions, preferably with the simultaneous regeneration of acid, and the foul leach solutions, practically freed from copper, are then electrolyzed to convert the ferrous salt into the ferric condition. The ferric salt so formed is produced at the expense of power and free acid. If, for example, a solution of base metal chlorides is electrolyzed, chlorine is liberated at the anode, and this chlorine, combining with the ferrous salt, converts it into the ferric condition, while at the same time the acid in the solution is consumed to re-establish an equilibrium.

It is frequently desirable to maintain as much acid as possible in the leach solution, for the reason that the acid acts on the oxidized copper in the ore, and an acid solution of ferric chloride, or chlorine, for example, is more effective in chloridizing the gold and silver and copper in its sulphide combinations, than is a neutral solution. On this account it frequently becomes desirable to apply chlorine gas to the solution in preference to electrolyzing the solution direct. It is advisable, however, to apply the gas to the leach solution only after the copper has been quite thoroughly precipitated. If the gas were applied to a solution containing a considerable amount of copper, much of the chlorine would be consumed in changing the copper from the cuprous to the cupric condition, and, again, there would be a waste in changing it back to the cuprous condition for the purpose of precipitation. Of course, cupric chloride acts as an effective chloridizer of the silver, but it is believed that ferric chloride acts quite as effectively, or perhaps more effectively, on both silver, and copper in some of its sulphide combinations. It is preferred, therefore, in the operation of this process, to apply the chlorine to a regenerated acid solution practically free from copper, and necessarily containing a large percentage of salts of iron.

In general, it is preferred to leach the ore with a chloride solution to extract the copper soluble in such a leach solution, until the copper is fairly well extracted. The copper is precipitated from the leach solution, preferably by electrolysis, with hydrogen sulphide, or both; the precipitation should be quite complete. The regenerated acid solution, charged with salts of iron, is separated from the resulting precipitated copper, and treated with free chlorine. The chlorine will convert the ferrous chloride into the ferric chloride, and this ferric chloride acts effectively on the silver and residual copper, when the solution is applied to the ore. If there is gold in the ore, the solution is charged with an excess of chlorine, preferably to saturation, and this free chlorine acts on the gold, on the silver, and on the copper. The acid in the solution, resulting from the deposition, or precipitation, of the copper, acts to protect the chlorine, and this makes the application of chlorine to copper-gold ores more effective than would otherwise be the case. That the chlorine acts on the copper before it effectively acts on the gold may be seen from the following test: A copper-gold ore, containing 19.3% copper, was roasted and leached with an acid solution, and showed an extraction of 96.3% of the copper. The copper-leach residues assayed 0.9% copper, and 1.11 oz. in gold. The tailing, after chlorine treatment, assayed 0.10% copper, and 0.02 oz. in gold, showing a total extraction of 99.5% of the copper and 98.2% of the gold.

The process may be described more in detail by referring to the accompanying drawing, Fig. 1, which represents a flow sheet in diagrammatic section.

The ore, which may be supposed to contain copper, gold, silver, and possibly lead and other metals, is charged into the leaching tank and treated with an acid chloride solution. This solution will dissolve most of the copper, but will have little or no effect on the gold and silver. The resulting solution containing copper chloride and considerable amounts of iron chloride is flowed into the $SO_2$ reducer, where it is treated with sulphur dioxide to reduce the cupric copper to the cuprous condition and the ferric iron to the ferrous condition. The reduced solution then flows into electrolyzer No. 1, where a portion of the copper is deposited at the cathode and an equivalent of chlorine liberated at the anode. The chlorine liberated at the anode will first combine with the excess of sulphur dioxide gas in the electrolyte, and after the excess gas is consumed the chlorine will react with the cuprous and ferrous salts to convert them into the cupric and ferric conditions. This latter condition, however, is not allowed to proceed very far, and the flow of copper solution through the cells is regulated so that only a small portion of the variable valent salts will be raised to a higher valency. The larger portion of the solution issuing from the electrolyzer No. 1, is again returned to the $SO_2$ reducer, where the solution is again completely reduced, when it is again flowed through the electrolyzer, and the cycle repeated, as described. A portion of the solution, representing the advance flow, flows into the CuS reducer, where the ferric and cupric salts are reduced with concentrated copper sulphate, preferably with the precipitate obtained by precipitating the copper from the lean solutions with hydrogen sulphide. The reduced solution then flows into the electrolyzer No. 2, where more copper is deposited and the variable valent salts raised to a higher valency. As before, the larger portion of the electrolyzed solution is returned to the CuS reducer, and then again electrolyzed, and the cycle repeated, while another portion, the advance flow, flows into the precipitator, where the remainder of the copper is precipitated from the solution, preferably with hydrogen sulphide. The solution together with the precipitate flows into the separator, where the precipitate is separated from the solution. The precipitate is conveyed to the CuS reducer, where much of the copper in the precipitate is consumed in reacting, on the ferric and cupric salts, as already described. The depleted copper solution is flowed into the chlorinator, where it is treated with gaseous chlorine generated, from common salt, in the NaCl electrolyzer. The solution is thoroughly impregnated with the gas in the chlorinator, and this is effectively accomplished by maintaining a relatively large pool of the solution in a closed chamber, adapted to confine the chlorine gas over the solution, and then, with rotary mechanism within the chamber, rotating at a high speed, spraying the solution into the gaseous atmosphere over the solution. In this way the entire pool of solution is under continuous treatment with the gas. The lower valency salts are again raised to a higher valency and the solution saturated with free chlorine. The prepared solution then flows into the chlorinated solution tank, from which it may be drawn into the leaching tank as desired.

It is evident, that if the solution, before chlorinating, contained much copper, a great deal of chlorine would be consumed in combining with the cuprous copper to convert it into the cupric condition, and the cupric copper would have to be reduced again preparatory to precipitation, and this would represent a loss of chlorine and precipitant. The highly chlorinated solution, applied to the ore after the larger portion of the copper has been extracted, acts energetically on the gold and the silver to convert them into the form of chlorides. The gold is readily soluble in any ordinary solution, and the silver chloride is soluble in a chloride solution.

The chlorinated solution, issuing from the leaching tank, and containing gold, silver, some copper, and lead, if there is lead in the ore, is flowed into the hydrogen sulphide precipitator, where all the metals are precipitated, as the sulphides, with hydrogen sulphide. These sulphides are sent to the CuS reducer, where much of the copper is re-dissolved, and converted into the electrolytic metal, as described. The copper precipitate residue, still containing some copper, is filtered and roasted in the precipitate roasting furnace. This converts the sulphides into the sulphates and oxides. The roasted material is drawn into the precipitate separator tank, where sulphuric acid is applied to it. The dilute sulphuric acid solution dissolves the copper, as sulphate, and the copper sulphate solution may be electrolyzed to recover the copper as the electrolytic metal, in electrolyzer No. 3. The gold, of the precipitate, is insoluble in a sulphate solution; the silver, owing to a small amount of chloride which may be present, or added, converts the silver into the insoluble chloride, if it occurs as sulphate; the lead will be in the form of sulphate, or some possibly also as choride, and is insoluble in a sulphate solution in either form. This residue, therefore, consisting of the residual gold, silver, and lead, may be easily treated to recover the metals in the metallic form, as is well known.

At times it may be desirable to add a highly concentrated copper sulphide, such as chalcocite, to the CuS reducer, to reduce the ferric salts. Concentrated chalcocite is an effective reducer of ferric salts, as also, to some extent, of cupric salts, under these conditions. The first atom of copper in the chalcocite, $Cu_2S$, is particularly efficient as a reducing agent for the ferric and cupric salts. When, therefore, the most active copper has been consumed in the CuS reducer, the copper sulphide concentrate, may be drawn into the roasting furnace, and roasted, and then conveyed to the leaching tank, where the remainder of the copper is extracted. The sulphur gas from the roasting furnace may be used as the reducing agent in the $SO_2$ reducer.

In the electrolysis of common salt, to produce the chlorine used in the process, caustic soda is produced at the same time, as is well known. This caustic is used to regenerate the chloride solvent for the metals. In leaching the ore with an acid chloride solution, many injurious impurities are also dissolved. By applying the caustic to the foul leach solution, the injurious metals are precipitated, while sodium chloride is regenerated. In this way the leach chloride solution may be kept reasonably pure, and kept up to the standard of chloride content to effectively dissolve the silver and maintain the cuprous chloride in solution, when the cupric chloride is reduced to the cuprous chloride.

Caustic lime may also be used as a purifying and precipitating agent, and in this way, much impurity may be eliminated as the insoluble calcium sulphate. Large quantities of sulphates in the chloride solution are injurious, and deter the solvent action of the solution, for the silver, the lead, and the cuprous copper. By applying caustic lime, from time to time, much of the sulphate may be eliminated. If any of the lime is converted into calcium chloride, it will be desirable, for, calcium chloride is a better solvent for the silver chloride, than sodium or any of the other chlorides. The precipitation and elimination of the undesirable impurities with the caustic soda or caustic lime is carried out in the reactor. The foul precipitate may be wasted, and the regenerated and purified chloride solution is flowed to the chlorinator, and from there to the leaching tank.

The chemical precipitation of the copper as the sulphide offers many advantages over other methods of chemical precipitation. For roasting or smelting, the sulphide precipitate, however, one great disadvantage in that the precipitate is voluminous, and when dried is extremely light, so that a very large portion of it, in any ordinary pyrometric operation, such as roasting or smelting, is carried off with the furnace draft and lost, unless collected at considerable expense.

The ordinary way of roasting any material, especially a sulphide, is to subject it to heat and air and more or less continuous agitation, or rabbling. Under these conditions it would be more or less impractical to roast a sulphide precipitate, largely on account of the excessive dust loss.

I have found that if a copper sulphide precipitate is charged into a roasting furnace, as sludge, and then subjected to heat, the sludge is dried and ignited without any loss, or appreciable loss, through dusting. The particles become somewhat cohesive during both the drying and roasting. The surface of the charge is ignited almost immediately after the moisture has been sufficiently evaporated, and the surface contour of the charge does not appreciably alter its shape before ignition takes place, or even for some time after ignition. After ignition has taken place the mass becomes somewhat plastic, and the charge may, or may not, be rabbled to complete the oxidation. The charge may be roasted quite effectively without rabbling at all, and at a fairly high temperature. The temperature should not, of course, be so high as to melt the precipitate. If the precipitate is roasted at an ordinary high roasting temperature, the resulting oxide will be very porous and very readily soluble in dilute acids. If there are any impurities in the precipitate, such as iron salts, they will be oxidized during the roasting and made insoluble.

If a chloride solution is used to dissolve the copper from the ore, the precipitate should be given a thorough washing to free it from chlorides before roasting.

In roasting a charge of precipitate, it is preferred to charge it into the furnace still containing considerable moisture, or as it comes from the filter press, to a depth of several inches. It is then brought to an ignition temperature as quickly as possible, and in bringing it to this temperature it will acquire a certain amount of rigidity, coherence, or set. It is preferably not rabbled during the period of drying and ignition; it is preferably kept quiescent, or nearly so, to achieve the object desired, as opposed to rabbling in an ordinary furnace, or in ordinary hand roasting operations. The roasting of the charge, after ignition and after considearble of the sulphur has been eliminated, may be completed with, or without, rabbling. This method of roasting, or of drying and roasting, is also cheaper than ordinary rabble roasting, in that the labor is reduced to a minimum. The roasted material, roasted in this way, wil be in the form of porous lumps. The fines will be granular and quite free from dust, as roasting dust is ordinarily understood.

Cement copper is also advantageously roasted under these conditions. If cement copper is roasted under ordinary conditions, the dusting will be excessive. If roasted under the conditions of this process, without rabbling in the first stages of the roasting, the cement copper will acquire a "set" which converts it into lumps, and these lumps are quickly and completely soluble in dilute acid.

While the general process of converting the chemically precipitated copper into electrolytic metal is not dependent upon the roasting described, it is an important step in the economical and practical application.

In the application of the general process to low grade copper ores containing other metals, leaching with a chlorine solution permits of the simultaneous extraction of all the metals, such as copper, gold, silver, and lead, and their complete chemical precipitation, preferably as sulphides, while the roasting of the chemical precipitate and leaching of the roasted precipitate with a sulphate solution, offers a convenient way of separating the copper from the other metals, and of obtaining exceedingly pure copper in the electrolytic form.

If the copper ore contains silver or lead, or both, it will be desirable to use a fairly concentrated chloride solution as the leaching solvent.

If the ore contains considerable copper it will usually be desirable to first leach with a sulphate solution to extract the larger portion of the copper, while the other metal values, including the portion of the copper which is not readily soluble in a sulphate solution, remain in the residue. The residue is then treated with a chlorine solution. In this way a close extraction of the remaining metals, gold, silver, lead, and copper, can be made. The metals are preferably precipitated together from the chloride solution, preferably with hydrogen sulphide or metallic iron. This complex precipitate is then washed and roasted. The copper is converted into the oxide or sulphate, and in that form is readily soluble in a dilute solution of sulphuric acid, while the gold, the silver, and the lead remain insoluble. A dilute solution of sulphuric acid is applied to the precipitate, after roasting, and this re-dissolves the copper as the sulphate. The resulting copper sulphate is quite pure and can be easily electrolized to deposit the copper as the pure electrolytic metal and regenerate the acid, which is cyclically used in the process. This separates the copper of the precipitate from the other metal values. The residual precipitate is then easily treated to recover the other metals in metallic form.

In this general method of procedure in the treatment of high grade copper complex ore the copper may be electrolytically obtained from sulphate solutions or electrolytes, while the remaining metals may be recovered in elemental form, using a chloride solution as the leaching medium.

Figure 2:
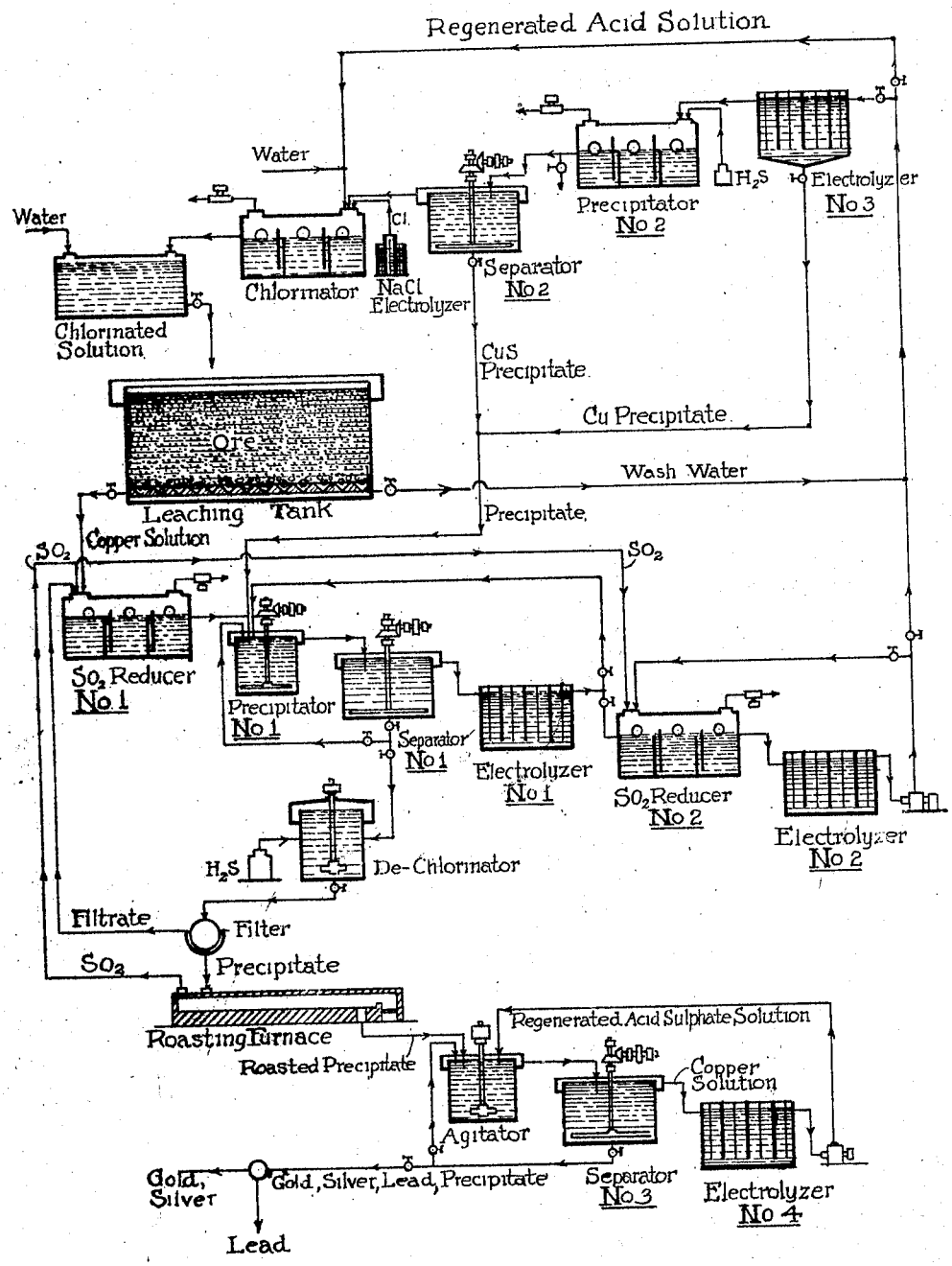

In the modified flow sheet, Fig. 2, the process may best be described by assuming, say, a copper concentrate, suitably roasted, and containing either gold, silver, or lead, or all, in addition to the copper.

The copper is leached from the roasted ore or concentrate, with a chloride solution of sufficient strength to maintain cuprous chloride, silver chloride, and lead chloride in solution. The leach solution will, necessarily, contain salts of iron. The leach solution, as applied to the ore, will usually contain much of the iron and much of the copper in the form of cupric and ferric salts. These salts, as is well known, exert a strong chloridizing action on the metals to be extracted. Cupric chloride and ferric chloride, especially at elevated temperatures and under agitation, convert the silver and the lead into the form of chlorides, and if there is gold in the ore, free chlorine in the solution will convert the gold into the chloride. All of these chlorides, as also some of the sulphates, such as lead sulphate, are soluble in strong chloride solution. The copper solution issuing from the leaching tank will, therefore, contain either silver, gold, or lead, or all three, in solution. Some of the copper will be in the cupric state and some in the cuprous state. Some of the iron will be in the ferric state and some in the ferrous state.

Ferric iron and cupric copper are highly injurious in the electrolytic deposition of the copper, and, as it is desirable to eliminate the other metals from the copper solution before electrolysis, it is desirable to reduce the salts of the variable valent elements preparatory to further treatment.

This is done by applying sulphur dioxide to the copper solution in the $SO_2$ reducer No. 1. The sulphur dioxide reduces the ferric iron and the cupric copper, while an equivalent of acid is regenerated. The strong chloride solution maintains the cuprous chloride in solution.

The reduced solution is then flowed into agitator No. 1, where it is agitated with copper precipitate. This precipitate is preferably in the form of sulphide, obtained from precipitating the copper from the lean and foul solutions with hydrogen sulphide, but it may be in some other form, such as a metal precipitate obtained either by depositing the copper from lean and foul solutions by electrolysis at a high current density, or by precipitating with iron. Under the action of the precipitant, in agitator No. 1, the other metals, the silver, gold, and lead, are quickly precipitated, while an equivalent of copper goes into solution, and all the copper in the solution will be maintained in the cuprous condition. The solution in the agitator, from which the other metals have been precipitated, flows into separator No. 1, where the precipitated metals are separated from the copper solution. The precipitate may be withdrawn from time to time, as the precipitate becomes charged with other metals and the copper becomes exhausted. The clear overflowing reduced copper solution flows into electrolyzer No. 1, which may represent a group of electrolyzers, where the copper is deposited as the electrolytic metal, while acid and cupric and ferric salts are regenerated.

If the regenerated ferric and cupric salts in the electrolyte, due to electrolysis, exceeds a certain small limit, say, 0.25% of either, or both, the efficiency of the deposition is greatly impaired. As soon, therefore, as the ferric and cupric salts exceed, say, a predetermined limit, fixed by experience, the solution is again reduced with sulphur dioxide, to convert the cupric and ferric salts into the cuprous and ferrous conditions. The reduced solution is then again electrolyzed, and this cycle of reduction and electrolysis is continued until the solution is sufficiently depleted in copper and regenerated in acid, when it is returned to the ore. It will usually be found advisable to do this in stages, so that the solution of one electrolytic unit will flow in a sort of closed circuit, while at the same time there is a progressive advance flow through all of the electrolytic units, and finally back to the ore.

If the ore contains gold, the solution is treated with chlorine to convert the cuprous chloride and the ferrous chloride into the cupric chloride and ferric chloride, respectively, and is also charged with free chlorine. The solution, so treated, acts energetically on the gold and silver to convert them into the chlorides and make them soluble in the leach solution. If the original ore or concentrate contains considerable copper, it is not advisable to charge the leach solution with chlorine until after the copper has been largely extracted, because, the copper is readily soluble in an acid solution, even if the copper and iron in the solution are in the cuprous and ferrous conditions, and it will be cheaper, under such circumstances, to first leach the larger portion of the copper from the ore, than to apply free chlorine to the solution until it becomes necessary to extract the other metals.

In returning the solution to the ore, a small amount of the solution will be diverted, or withdrawn, to keep the solution at some standard, and this standard will usually be determined by the iron content, and may range from 2 to 4 per cent iron, as experience may determine for each particular case. This diverted solution is flowed into electrolyzer No. 3, where the copper is precipitated out as closely as possible, preferably with a high current density. In this way the copper is precipitated in sub-divided form, as a sponge or as granules, and this finely divided copper is flowed into the precipitator No. 1, where it may be used to precipitate the gold, silver, and lead, from the leach copper solution, while an equivalent of copper goes into solution, as already described. The impoverished copper solution from electrolyzer No. 3, as also some of the wash water, flows into the precipitator No. 2, where the remaining copper is completely precipitated with hydrogen sulphide. The barren solution and precipitate flow into separator No. 2, where the sulphide precipitate is separated from the barren solution. The barren solution may be wasted, or flowed into the chlorinator, and on to the chlorinated solution tank for re-use. The precipitate is flowed, as a sludge, into the precipitator No. 1, where the sulphide precipitate acts the same as the finely granulated or sponge copper to precipitate gold, silver, and lead, from the leach copper solution, while an equivalent of copper goes into solution.

The gold, silver, and lead, as also the ferric and cupric salts formed in electrolyzer No. 1, tend to remove the copper from the precipitate, and this is continued until it becomes desirable to remove the precipitate from the leach copper solution circuit. The precipitate is withdrawn, and flowed into the de-chlorinator, where it is treated, say, with hydrogen sulphide, which combines with the insoluble chlorine, like that in the form of cuprous chloride, and converts the copper into the sulphide, while the chlorine is made soluble as hydrochloric acid. The precipitate, treated to make the insoluble chlorine soluble, is then flowed into the filter, where it is filtered and washed to free it from chlorine or chlorides. The washed precipitate is then roasted, and the roasted precipitate is treated with dilute sulphuric acid in the agitator. The copper readily goes into solution as the sulphate, while the gold, silver, and lead, remain insoluble. The copper sulphate solution flows from the agitator into the separator, where the clear copper solution overflows at the top, and flows into electrolyzer No. 4, where the copper is deposited electrolytically, with an equivalent regeneration of acid. The regenerated acid is returned to the roasted precipitate, and the cycle continued until the copper is quite thoroughly removed from the precipitate. The gold, silver, and lead, are then easily recovered from the precipitate residue, as the elemental metals, by any of the well known methods.

The sulphur dioxide from the roasting furnace is applied to the leach copper solution, as a reducing agent, as already described.

It will be seen that this method of treating copper ore containing other metals, provides for the simultaneous extraction of all the metals with one solution, and that it provides for the recovery of any or all of the metals in elemental form, which can be sold direct to the consumer.

A consideration of importance in this process, using chloride solution as the solvent, will now be pointed out, and it is believed that this is an important factor in the consideration of leaching and electrolytic precipitation and regeneration.

It is known that carbon anodes are fairly pronounced in their depolarizing action in the deposition of copper in the presence of a suitable depolarizer, such as ferrous salt. With sulphate solutions it has been found very difficult to get sufficient depolarizing action to prevent the carbon anodes from disintegration, and hence, from being used on a commercial scale. Lead anodes are, therefore, ordinarily employed; but lead anodes are not pronounced in their depolarizing action, and do not appreciably reduce the voltage of copper deposition, even in the presence of a good depolarizer, such as ferrous iron.

I have found, that while carbon anodes are usually quickly disintegrated with sulphate solutions, they are but little affected with chloride solutions containing sulphates, such, for example, as may be formed by the use of sulphur dioxide in treating the ore or the solutions, or by roasting sulphide copper ore with salt. It is evident that this opens a wide field, and, while 1.5 pounds of copper, per kw.-hr. is probably the effective limit in the deposition of copper from sulphate solutions, it would be quite practical to deposit as much as 5.0 pounds, per kw.-hr., from chloride solutions, necessarily containing sulphates, when sulphur dioxide is used as a reducing agent. This can be made plain, as follows: the electric current deposits twice as much copper, per ampere, from a cuprous as from a cupric solution, and the solution can be maintained largely cuprous by the use of sulphur dioxide, as employed in this process. The leach copper solution will therefore contain the copper in the cuprous form, and the iron in the ferrous form. Both cuprous copper and ferrous iron are very effective depolarizers, using carbon anodes, and the voltage of copper deposition can be maintained at, or below, 1.0 volt.

Under these conditions, 5.0 pounds of copper can be deposited, per kw.-hr., from cuprous solutions, using carbon anodes, as against 1.5 pounds, with a sulphate solution, using lead, or ferrous silicon anodes. It will be observed that the circulation of the solution between the electrolyzers and the reducers, in a sort of closed circuit, as described, with a progressive advance flow of a portion of the solution through the entire circuit, or cycle, amply provides for maintaining the ferric and cupric salts in the copper solution at a very low limit, or, say, 0.25 per cent, for the ample realization of the depolarization expected.

If the ore contains zinc, cobalt, nickel, etc., it is preferred to precipitate some or all of the copper and some of the other metals, from the regular leach solution—preferably the solution to be wasted and necessarily containing some zinc cobalt and nickel—then treating the residue with the solution and free chlorine, and then recovering all the desired metals from the resulting chloride solution. Hydrogen sulphide is first applied to the resulting chloride solution to precipitate the metals capable of being precipitated with hydrogen sulphide from an acid solution, and then the zinc cobalt or nickel can be recovered from the resulting solution. Zinc cobalt or nickel, like other metals, cannot be closely extracted with a simple acid solution, but on the application of chlorine to the partly treated ore, the zinc cobalt and nickel may be very closely extracted, and by using the waste solutions from the first leaching, the solution is all the while being enriched in the metals not precipitated by the electric current or with hydrogen sulphide. Metals, such as zinc, cobalt, and nickel, are all the while being concentrated in the solution, while other metals, such as copper, are being eliminated, and this greatly facilitates the recovery of the cobalt and nickel.

I claim:

1. A process for treating copper ores, comprising, leaching the ore with a chloride solution, chemically precipitating the copper from the resulting solution with the simultaneous regeneration of acid, then applying gaseous chlorine to the solution after precipitation, and returning the solution to the ore.

2. A process of treating copper ores comprising, leaching the ore with a chloride solution to extract a portion of the copper, precipitating a portion of the copper from the resulting solution electrolytically, precipitating a portion chemically, then applying chlorine to the depleted copper solution, and returning the solution to the ore.

3. A process of treating copper ores comprising, leaching the ore with a chloride solution, to extract a portion of the copper, chemically precipitating the copper from the resulting solution with the simultaneous regeneration of acid, electrolyzing sodium chloride to produce chlorine and caustic soda, and applying both the chlorine and caustic soda to the leach solution, and returning the solution to the ore.

4. A process of treating copper ores comprising, leaching the ore with a chloride solution to extract a portion of the copper, chemically precipitating the copper from the resulting solution, and applying caustic lime to the solution to eliminate the sulphates from leach solution, and returning the solution to the ore.

5. A process of treating copper ores comprising, leaching the ore with a chloride solution to extract a portion of the copper, chemically precipitating the copper from the resulting solution, electrolyzing sodium chloride to generate chlorine and caustic soda, applying both the caustic soda and the chlorine to the leach solution, and returning the solution to the ore.

6. A process of treating copper ores comprising, leaching the ore with a chloride solution to extract a portion of the copper, precipitating the copper from the resulting solution with a sulphide precipitant capable of regenerating acid, then applying gaseous chlorine to the solution, and returning the solution to the ore.

7. A process of treating ores of copper comprising, leaching the ore with a chloride solution to extract a portion of the copper, precipitating a portion of the copper from the resulting solution electrolytically, precipitating a portion chemically, electrolyzing sodium chloride to generate chlorine, applying the chlorine to the leach solution, and returning the solution to the ore.

8. A process comprising, leaching ores of copper with a chloride solution to extract a portion of the copper, precipitating a portion of the copper from the resulting solution electrolytically while subjecting the solution to alternate reduction and electrolysis, precipitating a portion of the copper chemically, applying the chemical precipitate to the electrolyte, applying chlorine to the depleted copper solution, and returning the solution to the ore.

9. A process of treating copper ores comprising, leaching the ore with a chloride solution to extract a portion of the copper, precipitating a portion of the copper electrolytically, electrolyzing sodium chloride to generate chlorine and caustic soda, applying the caustic soda to a portion of the solution to precipitate undesirable impurities, then applying the chlorine to the solution regenerated in sodium chloride, and returning the solution to the ore.

10. A metallurgical process comprising, treating ores of copper with an acid solution, precipitating the copper out of the resulting solution as the sulphide, separating the sulphide precipitate from the resulting solution, then roasting the precipitate to convert the sulphide into the oxide, and then re-dissolving the copper from the roasted precipitate and electrolyzing the solution containing the re-dissolved copper to obtain the electrolytic metal.

11. A metallurgical process comprising, treating copper ores with an acid solution to extract the copper, precipitating the copper from the leach solution as the sulphide, separating the sulphide precipitate from the leach solution, subjecting the precipitate to heat under relative quiescence during the early stages of heating or roasting, re-dissolving the copper from the roasted precipitate, and electrolyzing the resulting copper solution to obtain the electrolytic metal.

12. A metallurgical process comprising, treating ores of copper with a solvent for the copper, chemically precipitating the copper from the resulting solution, separating the precipitate from the leach solution, roasting the precipitate under relative quiescence, then re-dissolving the copper of the roasted precipitate and electrolyzing the resulting copper solution to obtain the copper as the electrolytic metal.

13. A metallurgical process comprising, treating copper ores with a solvent for the copper, precipitating the copper from the resulting solution as the sulphide, separating the sulphide precipitate from the resulting leach solution, charging the moist precipitate into a furnace and heating it sufficiently under comparative quiescence to evaporate the moisture and ignite the sulphur of the precipitate, completing the roasting, re-dissolving the copper of the roasted precipitate, and electrolyzing the resulting solution to obtain the electrolytic copper.

14. A process of treating ores of copper containing other metals comprising, leaching the ore with a chloride solution to extract the metals, chemically precipitating the copper and other metals from the resulting solution with the same precipitant, roasting the precipitate, applying a sulphate solution to the roasted precipitate to dissolve the copper, electrolyzing the resulting copper solution to recover the copper as the electrolytic metal with the simultaneous regeneration of acid, returning the regenerated acid solution to the roasted precipitate and continuing the cycle until the copper has been sufficiently removed from the roasted precipitate, and then recovering the remaining metal values from the roasted precipitate residue.

15. A process of treating copper ores containing other metals comprising, leaching the ore with a chloride solution to extract the metals, precipitating the copper and the other metals from the resulting leach solution with hydrogen sulphide, separating the precipitate from the leach solution, returning the solution to the ore, washing the precipitate to free it from chlorides, roasting the precipitate, applying a sulphate solution to the roasted precipitate to re-dissolve the copper, electrolyzing the resulting copper solution to deposit the copper and regenerate acid, returning the regenerated acid solution to the roasted precipitate, and recovering the remaining metal values from the precipitate residue.

16. A process of treating copper ores containing other metals comprising, leaching the ore with a chloride solution to extract the metals, precipitating a portion of the copper from the resulting solution electrolytically, precipitating a portion chemically, applying the chemical precipitate to the electrolyte to re-dissolve a portion of the copper from the precipitate, roasting the precipitate residue, leaching the roasted residue to remove the remaining copper, and then recovering the remaining metal values from the roasted and leached residue.

17. A process of treating copper ores comprising, leaching the ore with a solvent for the copper, chemically precipitating the copper from the resulting leach solution, separating the copper precipitate from the solution, roasting the precipitate, then re-dissolving the copper with a solution relatively free from injurious impurities, and electrolyzing the resulting copper solution to obtain the electrolytic metal.

18. A metallurgical process comprising, leaching copper ores with a solvent for the copper, precipitating the copper from the resulting solution as the sulphide, roasting the sulphide precipitate to oxidize the copper with the simultaneous liberation of sulphur dioxide, re-dissolving the copper from the roasted precipitate, electrolyzing the resulting copper solution to obtain the electrolytic metal, and applying the sulphur dioxide from the roasting precipitate to the electrolyte.

19. A process of treating copper ores comprising, leaching the ore with a solvent for the copper, chemically precipitating the copper from the resulting leach solution, separating the copper precipitate from the solution, roasting the precipitate under relative quiescence of the particles which compose the precipitate in relation to one another, then re-dissolving the copper from the roasted precipitate with a solution relatively free from injurious impurities, and electrolyzing the resulting copper solution to obtain the electrolytic metal.

20. A process of treating copper ores comprising, leaching the ore with an acid solution to extract a portion of the copper, electrolyzing the resulting solution containing salts of iron to deposit the copper with the simultaneous regeneration of acid and ferric salts, applying copper sulphide concentrate to the electrolyzed solution whereby copper is dissolved from the sulphide concentrate and the ferric salts reduced to the ferrous condition, repeating the cycle until the solution is sufficiently depleted in copper, returning the depleted copper solution to the ore, roasting the concentrate residue still containing copper, and leaching the roasted concentrate residue with the regenerated solution formed by the electrolysis.

21. A process of treating copper ore comprising, leaching the ore with an acid solution to extract a portion of the copper, electrolyzing the resulting copper solution containing salts of iron to deposit a portion of the copper with the simultaneous regeneration of acid, chemically precipitating another portion of the copper with the regeneration of more acid, and then returning the regenerated acid solution to the ore.

22. A process of treating copper ore containing other metals comprising, leaching the ore with a sulphate solution to extract a portion of the copper, electrolyzing the resulting copper sulphate solution to deposit the copper and regenerate acid, returning the regenerated acid solution to the ore and repeating the cycle of leaching and electrolysis until the copper in the ore is sufficiently extracted with the sulphate solution, then treating the ore with a chloride solution to extract the residual metal values, precipitating the metals from the chloride solution with a chemical precipitant, roasting the the precipitate, then treating the roasted precipitate with dilute sulphuric acid to re-dissolve the copper from the other metal values in the precipitate, and then recovering the residual metal values from the precipitate residue.

23. A process of treating copper ores containing other metals comprising, leaching the ore with a sulphate solution, electrolyzing the resulting copper sulphate solution to deposit the copper and regenerate acid, returning the regenerated acid solution to the ore and repeating the cycle of leaching and electrolysis until the copper in the ore is sufficiently extracted with the sulphate solution, then treating the ore with a chloride solution to extract the residual metal values, precipitating the metals from the chloride solution with a chemical precipitant, roasting the precipitate, then treating the roasted precipitate with a sulphate solution to re-dissolve the copper from the roasted precipitate, electrolyzing the resulting copper sulphate solution to recover the copper of the precipitate as the electrolytic metal, and recovering the residual metal values from the precipitate residue.

24. A process of treating copper ores containing gold comprising, leaching the ore with a sulphate solution to extract a portion of the copper, electrolyzing the resulting copper sulphate solution to deposit the copper as the electrolytic metal with the simultaneous regeneration of acid, returning the regenerated acid solution to the ore and repeating the cycle of leaching and electrolysis until the copper in the ore is sufficiently extracted with the sulphate solution, then treating the ore with a chlorine solution to extract the gold and the remainder of the copper, chemically precipitating the gold and the copper from the resulting chloride solution, roasting the precipitate, then applying a sulphate solution to the roasted precipitate to re-dissolve the copper and leave the gold in the precipitate residue, and then recovering the gold from the precipitate residue.

25. A process of treating copper ores containing gold comprising, leaching the ore with dilute sulphuric acid to extract a portion of the copper, then treating the ore with a chlorine solution to extract the gold and the remaining copper, chemically precipitating the gold and the copper together from the resulting chloride solution, roasting the precipitate, and then treating the roasted precipitate with dilute sulphuric acid to separate the copper from the gold, and then recovering the gold from the precipitate residue.

26. A process of treating copper ores containing other metals comprising, leaching the ore with an acid chloride solution to extract the metals, applying sulphur dioxide to the resulting copper solution to reduce the salts of the variable valent elements from a higher to a lower valency, treating the resulting reduced solution with a precipitant capable of precipitating the other metals in the solution while retaining the copper in solution, electrolyzing the resulting solution containing cuprous chloride to deposit the copper and regenerate acid, and alternately subjecting the solution to electrolysis and reduction with sulphur dioxide until the solution is sufficiently depleted in copper and regenerated in acid and then returning the solution to the ore.

27. A process of treating copper ores containing other metals comprising, leaching the ore with an acid chloride solution to extract the metals, separating the resulting copper solution from the ore, washing the ore and chemically precipitating the metals from the washwater, treating the copper solution with sulphur dioxide, applying the chemical copper precipitate obtained from the washwater to the reduced copper solution to precipitate the other metals, then electrolyzing the copper solution freed from the other metals and containing the copper in the cuprous form to deposit the electrolytic metal and regenerate acid and ferric and cupric salts, applying a reducing agent to the electrolyzed solution to reduce the ferric and cupric salts, and continuing the cycle until the solution is sufficiently depleted in copper.

28. A process of treating copper ores containing other metals comprising, leaching the ore with an acid chloride solution, to extract the metals, separating the resulting metal solution from the ore, applying a reducing agent to the resulting copper solution containing salts of iron to reduce the ferric iron to the ferrous condition and the cupric copper to the cuprous condition, then precipitating the metals other than copper from the copper solution, electrolyzing the resulting cuprous copper solution to deposit the copper and regenerate acid and ferric and cupric salts, applying sulphur dioxide to the electrolyzed solution to reduce the ferric and cupric salts, and repeating the cycle of reduction and electrolysis until the solution is sufficiently depleted in copper, and then returning the solution to the ore.

29. A process of treating copper ores comprising, leaching the ore with a solution containing chlorine, precipitating the copper from the solution, treating the resulting precipitate with a substance capable of converting insoluble chlorine in the precipitate into soluble form, and then washing the precipitate to free it from chlorine.

30. A process of treating copper ores comprising, leaching the ore with a solution containing chlorine, precipitating the copper and other metals from the solution, treating the precipitate with a substance capable of converting insoluble chlorine into soluble form, then washing the precipitate to free it from chlorine, roasting the precipitate, then treating the roasted precipitate with sulphuric acid to dissolve the copper, and then recovering the other metals from the residue.

31. A process of treating ores containing copper and other metals, comprising, leaching the ore with an acid solution to extract some of the metals, precipitating some of the metals from the solution, then treating the ore with the resulting solution in the presence of free chlorine, applying hydrogen sulphide to the resulting chloride solution to precipitate some of the metals, and then recovering other metals from the solution freed from the sulphide precipitate.

32. A process of treating ores of metals comprising, leaching the ore with an acid solution to extract some of the metals, precipitating some of the metals from the solution, then treating the ore with the resulting solution and free chlorine, precipitating some of the metals from the resulting chloride solution, separating the precipitate from the solution, and then recovering other metals from the solution.

33. A process of treating ores of metals comprising, leaching the ore with an acid solution to extract some of the metals, precipitating some of the metals from the solution, then treating the ore residue with the resulting solution and free chlorine to extract the remaining metals, precipitating some of the metals from the resulting chloride solution, separating the resulting precipitate from the resulting solution, and then recovering other metals from the solution.

34. A process of treating copper ores containing other metals comprising, leaching the ore with a chloride solution, applying a reducing agent to the resulting solution containing copper and other metals, electrolyzing copper solution under conditions to deposit the copper in a granular or sponge form, and applying the copper so obtained to the leach copper solution to precipitate the other metals.

35. A process of treating copper ores comprising, leaching the ore with a solution containing chlorine, precipitating the copper and other metals from the solution, treating the precipitate with a substance capable of converting insoluble chlorine into soluble form, washing the precipitate to free it from chlorine, roasting the precipitate, then treating the roasted precipitate with sulphuric acid to dissolve the copper, electrolyzing the resulting copper solution to deposit the copper and regenerate acid, returning the regenerated acid solution to the precipitate, and when the copper is sufficiently removed from the precipitate recovering the other metals from the residue.

36. A process of treating copper ores containing other metals comprising, leaching the ore with dilute acid solution to extract the copper and other metals, electrolyzing the resulting copper solution containing salts of iron and of other metals to deposit copper and regenerate acid and ferric iron, applying concentrated copper sulphide to the solution to extract a portion of the copper from the concentrated copper sulphide with the simultaneous reduction of the ferric iron formed by the electrolysis to the ferrous state and repeating the cycle of reduction and electrolysis, and then when the desired portion of the copper has been extracted in this way from the sulphide concentrate, roasting the sulphide concentrate residue and leaching it to extract the remainder of the copper.

37. A process of treating copper ores containing other metals comprising, leaching the ore with a dilute acid solution to extract copper and other metals, electrolyzing the copper solution containing other metals to deposit copper and regenerate acid, returning the regenerated acid solution to the ore and repeating the cycle to accumulate other metals in the solution in amounts to make their recovery from the solution desirable, then when the solution becomes sufficiently enriched in other metals, precipitating the remaining copper chemically from the solution, and then recovering the other desired metals from the resulting solution freed from copper.

38. A process of treating copper ores containing other metals comprising, leaching the ore with a dilute acid solution to extract copper and other metals, electrolyzing the resulting copper solution containing other metals to deposit copper and regenerate acid, returning the regenerated acid solution to the ore and repeating the cycle of leaching and electrolysis to accumulate other metals in the solution in amounts to make their recovery from the solution desirable and from time to time recovering the other metals from the copper solution, and when the metals which are soluble in the dilute acid solution are sufficiently extracted from the ore, treating the ore residue to recover other desired metals therefrom.

WILLIAM E. GREENAWALT.